United States Patent
Liu et al.

(10) Patent No.: US 11,551,472 B1
(45) Date of Patent: Jan. 10, 2023

(54) METHOD OF FINGERPRINT RECOGNITION AND RELATED FINGERPRINT SENSING CIRCUIT

(71) Applicant: NOVATEK Microelectronics Corp., Hsin-Chu (TW)

(72) Inventors: Ping Liu, Hsinchu (TW); Chi-Ting Chen, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/749,096

(22) Filed: May 19, 2022

Related U.S. Application Data (60) Provisional application No. 63/248,998, filed on Sep. 27, 2021.

(51) Int. Cl.
  *G06V 40/12* (2022.01)
  *G06V 40/13* (2022.01)

(52) U.S. Cl.
  CPC .......... *G06V 40/1394* (2022.01); *G06V 40/13* (2022.01); *G06V 40/1347* (2022.01); *G06V 40/1365* (2022.01)

(58) Field of Classification Search
  CPC ............... G06V 40/1394; G06V 40/13; G06V 40/1347; G06V 40/1365
  See application file for complete search history.

(56) References Cited

U.S. PATENT DOCUMENTS

| | | | |
|---|---|---|---|
| 2018/0322328 A1* | 11/2018 | Pang | G06V 40/1388 |
| 2019/0065717 A1* | 2/2019 | Won | G06V 40/1318 |
| 2021/0004562 A1* | 1/2021 | Chiang | G06V 40/45 |
| 2021/0150178 A1* | 5/2021 | Wang | G06V 40/1347 |

* cited by examiner

*Primary Examiner* — Jonathan A Boyd
(74) *Attorney, Agent, or Firm* — Winston Hsu (57) ABSTRACT

A method of fingerprint recognition for a fingerprint sensing circuit includes steps of: performing a first fingerprint sensing process including a first exposure operation and a first readout operation under a first light spot setting; and performing a second fingerprint sensing process including a second exposure operation and a second readout operation under a second light spot setting. Wherein, a host performs a first fingerprint recognition in response to the first fingerprint sensing process; and wherein, the second light spot setting and the first fingerprint recognition are performed simultaneously.

28 Claims, 9 Drawing Sheets

METHOD OF FINGERPRINT RECOGNITION AND RELATED FINGERPRINT SENSING CIRCUIT

CROSS REFERENCE TO RELATED APPLICATIONS

This application claims the benefit of U.S. Provisional Application No. 63/248,998, filed on Sep. 27, 2021. The content of the application is incorporated herein by reference.

BACKGROUND OF THE INVENTION

1. Field of the Invention

The present invention relates to a method of fingerprint recognition and a related fingerprint sensing circuit, and more particularly, to a method of fingerprint recognition and a related fingerprint sensing circuit having fake fingerprint detection functions.

2. Description of the Prior Art

Fingerprint recognition is one of the most popular biometric authentication schemes commonly used in the industry. In recent years, product developers and researchers in this art have found the threats of fake fingerprint. A fake fingerprint is an artificial fingerprint made from a rubber, paper, film, or other object which is used to emulate a real fingerprint texture. For the sake of safety, the fingerprint recognition products should be capable of recognizing the fingerprint feature and also capable of identifying whether the received fingerprint is real or fake.

In order to effectively differentiate a real fingerprint and a fake fingerprint, the fingerprint recognition products should perform recognition with an algorithm for fake fingerprint detection. However, the operations of fake fingerprint detection in addition to the operations of fingerprint feature identification may consume a great amount of time, thereby reducing the user experience of fingerprint sensing and recognition.

SUMMARY OF THE INVENTION

It is therefore an objective of the present invention to provide a method of fingerprint recognition and a related fingerprint sensing circuit having fake fingerprint detection functions, where the timing of fingerprint recognition is well controlled to reduce the overall time consumption, thereby improving the user experience.

An embodiment of the present invention discloses a method of fingerprint recognition for a fingerprint sensing circuit. The method comprises steps of: performing a first fingerprint sensing process comprising a first exposure operation and a first readout operation under a first light spot setting; and performing a second fingerprint sensing process comprising a second exposure operation and a second readout operation under a second light spot setting. Wherein, a host performs a first fingerprint recognition in response to the first fingerprint sensing process; and wherein, the second light spot setting and the first fingerprint recognition are performed simultaneously.

Another embodiment of the present invention discloses a fingerprint sensing circuit, which is configured to perform steps of: performing a first fingerprint sensing process comprising a first exposure operation and a first readout operation under a first light spot setting; and performing a second fingerprint sensing process comprising a second exposure operation and a second readout operation under a second light spot setting. Wherein, a host performs a first fingerprint recognition in response to the first fingerprint sensing process; and wherein, the second light spot setting and the first fingerprint recognition are performed simultaneously.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
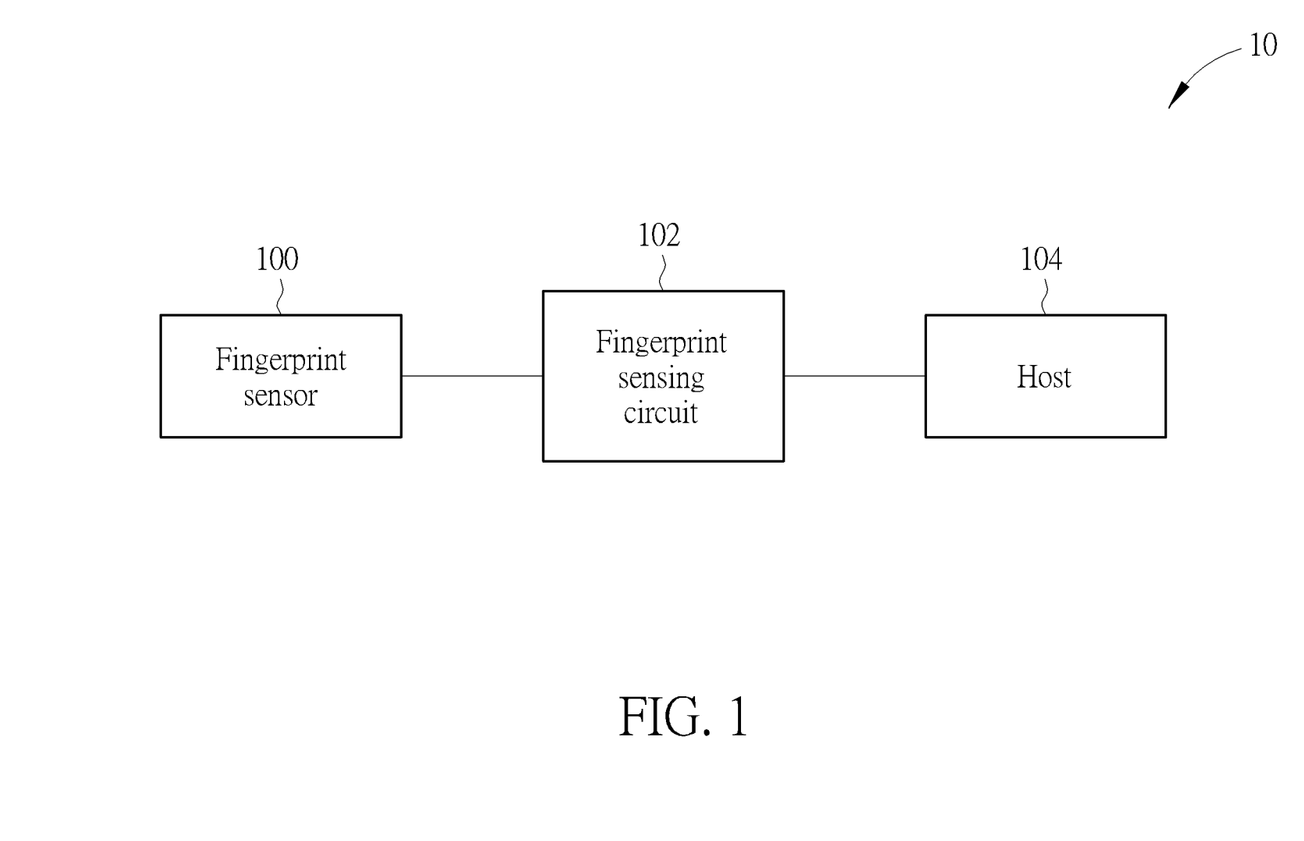
FIG. 1 is a schematic diagram of a fingerprint image processing system according to an embodiment of the present invention.

FIG. 1 is a schematic diagram of a fingerprint image processing system 10 according to an embodiment of the present invention. As shown in FIG. 1, the fingerprint image processing system 10 includes a fingerprint sensor 100, a fingerprint sensing circuit 102 and a host 104. In general, the fingerprint sensor 100 may be an optical fingerprint sensor, which includes a sensing pixel array, at least one light source, and a sensing pad on which a finger is allowed to put. The light intensity reflected from the touch finger may be sensed in each sensing pixel to generate fingerprint image signals, which are forwarded to the fingerprint sensing circuit 102 and then the host 104 for recognizing the fingerprint image. The detailed structure of the fingerprint sensor 100 is well known by those skilled in the art, and thus omitted herein.

The fingerprint sensing circuit 102 may be a fingerprint image processing integrated circuit (IC) implemented in a chip. In general, the fingerprint sensing circuit 102 is configured to receive fingerprint image signals (which are usually voltage or current signals) from the fingerprint sensor 100 and convert the fingerprint image signals into digital form, which are further sent to the host 104 for subsequent fingerprint recognition and matching. In several embodiments, the fingerprint sensing circuit 102 may process the fingerprint image signals, e.g., remove unwanted noises/offsets and amplify the signals, to improve signal quality, allowing the output image signals or data to be recognized more effectively.

Figure 2A:
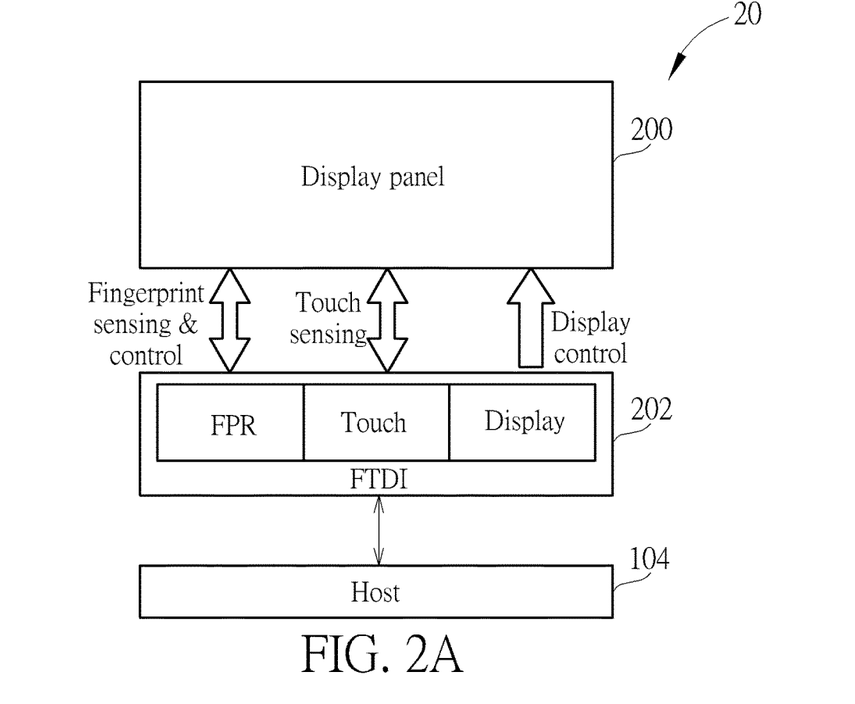
FIG. 2A illustrates a fingerprint image processing system integrated with touch control and display driving functions.

In an embodiment, the fingerprint sensor 100 may be integrated with a display panel, and the fingerprint sensing circuit 102 may be integrated with a touch controller and/or a display driver of the display panel, so as to realize a fingerprint, touch and display integration (FTDI) circuit. FIG. 2A illustrates a fingerprint image processing system 20 integrated with touch control and display driving functions. As shown in FIG. 2A, the fingerprint image processing system 20 includes a display panel 200, an FTDI circuit 202 and a host 104. The display panel 200 may be integrated with the fingerprint sensor 100. For example, the sensing pixels of the fingerprint sensor 100 may be deployed under a specific region or the entire screen of the display panel 200, so that the display panel 200 is a touch panel capable of receiving the fingerprint image of the touch finger, so as to realize the in-display fingerprint sensing function. Alternatively, the fingerprint sensor 100 may include a sensing pad deployed along with the screen of the display panel 200, where the sensing pad is used to receive the fingerprint image of the touch finger.

The FTDI circuit 202 may be a single chip integrated with the processing circuits for display, touch and fingerprint functions. More specifically, the FTDI circuit 202 may include a fingerprint sensing circuit (FPR) such as the fingerprint sensing circuit 102 shown in FIG. 1, a touch controller and a display driver. The fingerprint sensing circuit is configured to control the fingerprint sensing operations of the fingerprint sensor integrated with the display panel 200. The touch controller is configured to control the touch sensing operations such as the finger touch and/or stylus touch. The display driver is configured to output display data signals to the display panel 200 and perform related display control.

Figure 2B:
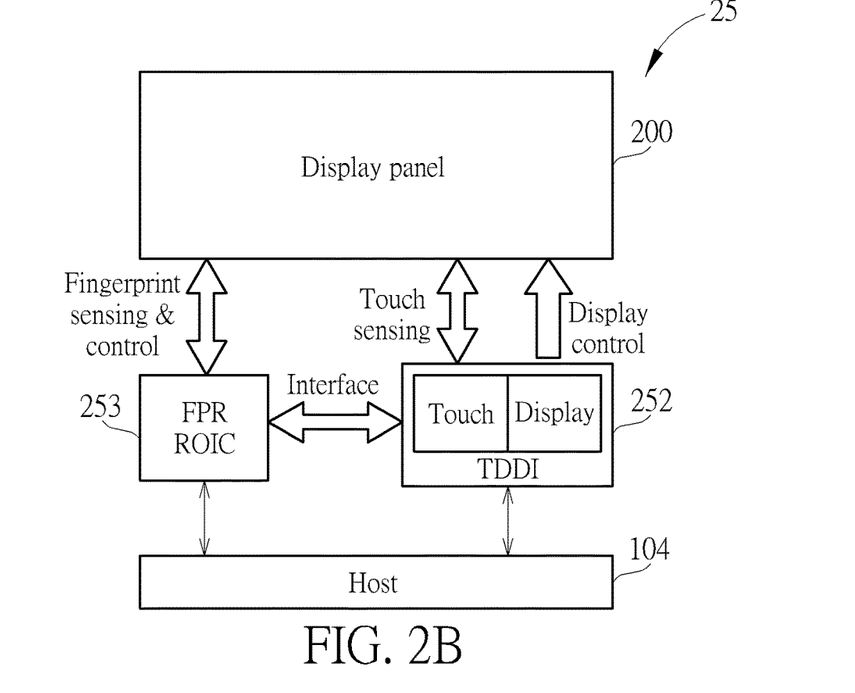
FIG. 2B illustrates a fingerprint image processing system integrated with touch control and display driving functions with multi-chip implementation.

In another embodiment, the single-chip FTDI circuit may be replaced by a multi-chip implementation. FIG. 2B illustrates a fingerprint image processing system. 25 integrated with touch control and display driving functions with the multi-chip implementation. As shown in FIG. 2B, the fingerprint image processing system 25 is different from the fingerprint image processing system 20 in that, the fingerprint image processing system 25 includes a touch and display driving integration (TDDI) circuit 252 and a fingerprint readout integrated circuit (FPR ROIC) 253, which replace the functions of the FTDI circuit 202 in the fingerprint image processing system 20. An interface is disposed between the TDDI circuit 252 and the fingerprint ROIC 253, for forwarding necessary messages such as a synchronization signal for synchronizing the display driving, touch sensing and fingerprint sensing functions.

In these embodiments, each of the FTDI circuit 202, the TDDI circuit 252 and the fingerprint ROIC 253 may communicate with the host 104 through one or more interfaces. Such interfaces may include, but not limited to, the serial peripheral interface (SPI), inter-integrated circuit (I2C) interface, and/or mobile industry processor interface (MIPI).

The host 104 shown in FIGS. 2A and 2B is equivalent to the host 104 shown in FIG. 1, and thus denoted by the same symbol. The host 104 may be a main processor of an electronic system, such as a central processing unit (CPU), microcontroller unit (MCU), application processor (AP), or the like. As for fingerprint recognition, the host 104 is configured to perform various fingerprint recognition processes, which include, but not limited to, pre-processing, feature extracting and matching. The host 104 thereby determines whether the fingerprint image received from the fingerprint sensor 100 matches a registered fingerprint image, in order to authenticate a specific function such as device unlocking, payment, or login to an application or a webpage. Since the operation of fingerprint recognition requires more complex computation and more storage space for storing the registered fingerprint image, the fingerprint recognition algorithm is preferably performed in the host 104, in order to simplify the circuit area and cost of the fingerprint sensing circuit 102.

Figure 3:
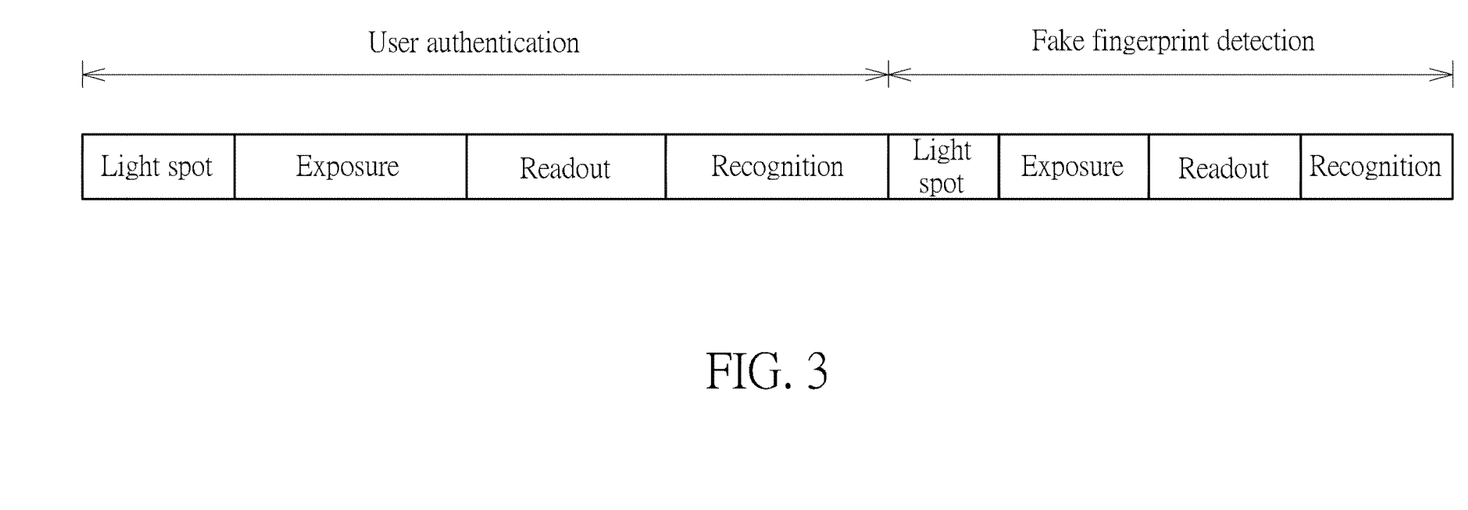
FIG. 3 is a schematic diagram of a general timing control scheme of fingerprint sensing and recognition applicable to a fingerprint image processing system.

FIG. 3 is a schematic diagram of a general timing control scheme of fingerprint sensing and recognition applicable to a fingerprint image processing system such as the fingerprint image processing system 10, 20 or 25 as shown in FIG. 1, 2A or 2B. When the host 104 needs to receive a fingerprint from a user, it may control the fingerprint sensing circuit 102 to perform the fingerprint sensing process. First, the host 104 may control the display driver to set up the light spot. In general, the light spot is requested to emit light with one or several specific wavelengths to the fingerprint sensing area (e.g., a sensing pad or panel), to illuminate the finger on the sensing area. After the light spot is ready (e.g., the brightness reaches a target level), the host 104 may send an image fetch command to the fingerprint sensing circuit 102. The image fetch command instructs the fingerprint sensing circuit 102 to start exposure operation and then readout the fingerprint image signals received from the fingerprint sensor 100. In the readout operation, the fingerprint sensing circuit 102 may sample the fingerprint image signals, process the fingerprint image signals such as amplify the signals and/or remove unwanted noises/offsets from the signals, convert the fingerprint image signals into digital data, and then output the fingerprint image data to the host 104. In response to the fingerprint image data received from the fingerprint sensing circuit 102, the host 104 performs fingerprint recognition based on a fingerprint recognition algorithm, to determine whether the fingerprint image matches any of the registered fingerprint(s), so as to perform user authentication.

Since the fingerprint image processing system is capable of performing fake fingerprint detection, the fingerprint sensing circuit 102 and the host 104 may further perform the fingerprint sensing/recognition processes for the fake fingerprint detection after the fingerprint sensing/recognition processes for user authentication. Specifically, the host 104 may control the display driver to set up the light spot for the fake fingerprint detection. The fingerprint sensing circuit 102 correspondingly performs the operations of exposure and readout, and then outputs the fingerprint image data to the host 104. In response to the reception of the fingerprint image data, the host 104 performs the recognition for fake fingerprint detection based on the corresponding algorithm. Note that the host 104 includes an algorithm for user authentication and an algorithm for fake fingerprint detection. In the first fingerprint recognition operation for user authentication, the host 104 may determine whether the received fingerprint belongs to a specific user. In the second fingerprint recognition operation for fake fingerprint detection, the host 104 may determine whether the received fingerprint is real or fake. After the above processes are complete, the host 104 may determine whether the fingerprint is correct and real, and correspondingly enable a specific function.

Please note that the fake fingerprint detection requires a special algorithm different from the algorithm for general fingerprint recognition processes for user authentication such as pre-processing, thinning, feature extraction and matching. This special algorithm for the fake fingerprint detection is dedicated to differentiation of real fingerprints and fake fingerprints. The light spots for general fingerprint recognition and fake fingerprint detection are also different. For example, the fake fingerprint detection may only require a small light spot illuminating partial finger region, where the small light spot has a dedicated feature that allows the host 104 to differentiate a real fingerprint and a fake fingerprint. Therefore, the light spot should be changed between the first exposure operation and the second exposure operation. The exposure time for fake fingerprint detection may also be shorter than the exposure time for general fingerprint recognition. This is because the fake fingerprint detection differentiates the real and fake fingerprints usually based on a smaller part of the fingerprint.

Figure 4:
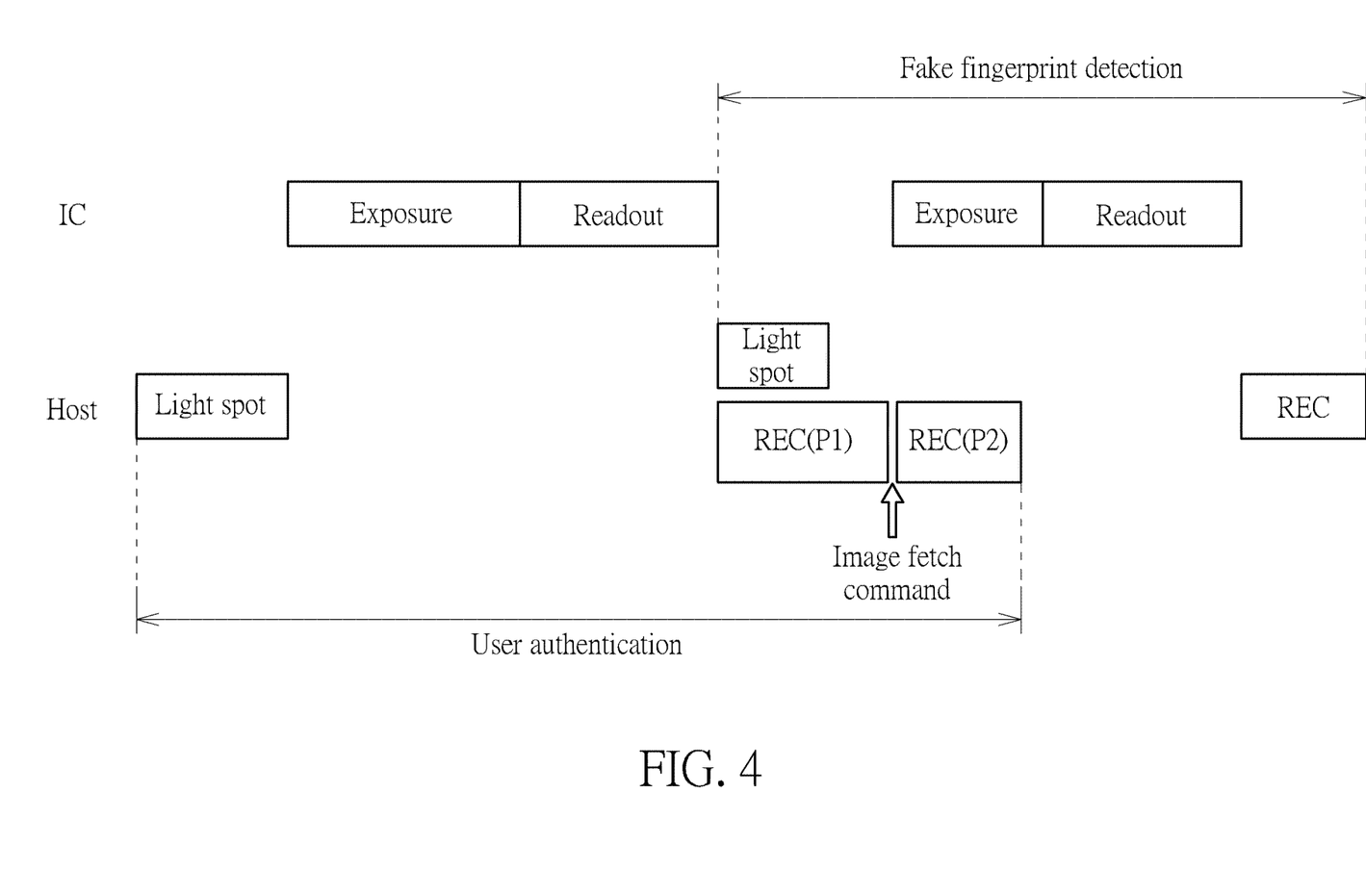
FIG. 4 is a schematic diagram of a timing control scheme of fingerprint sensing and recognition according to an embodiment of the present invention.

FIG. 4 is a schematic diagram of a timing control scheme of fingerprint sensing and recognition according to an embodiment of the present invention. As shown in FIG. 4, the operations of the host 104 and the fingerprint sensing circuit 102 are separately illustrated and specified more clearly, where the exposure and readout of the image signals are performed by the fingerprint sensing circuit 102 (abbreviated as "IC" in FIG. 4), and the light spot setting and fingerprint recognition (abbreviated as "REC" in FIG. 4) are performed by the host 104. In this embodiment, the general fingerprint sensing and recognition operations for user authentication are performed, which are followed by another fingerprint sensing and recognition operations for fake fingerprint detection.

In order to reduce the overall time consumption, the light spot setting for fake fingerprint detection may be performed earlier as compared to the general timing control scheme shown in FIG. 3. As shown in FIG. 4, the light spot setting for fake fingerprint detection and the fingerprint recognition process for user authentication are performed simultaneously. That is, when the host 104 performs the fingerprint recognition process for determining whether the fingerprint belongs to a correct user, the light spot setting for subsequent fake fingerprint detection is performed at the same time.

More specifically, supposing that the fingerprint recognition process for user authentication is performed in a first time period and the light spot setting for fake fingerprint detection is performed in a second time period, the second time period may overlap the first time period.

As shown in FIG. 4, an image fetch command is sent during the first fingerprint recognition process. More specifically, the host 104 may send the image fetch command to the fingerprint sensing circuit 102 during the first fingerprint recognition process, to instruct the fingerprint sensing circuit 102 to start exposure operation and then output the fingerprint image. Note that the fingerprint sensing is associated with a confidential operation, and should be performed in a trusted execution environment (TEE). Therefore, before the host 104 outputs the image fetch command to request the fingerprint sensing circuit 102 to start the fingerprint sensing operations, the operating system of the host 104 should enter the TEE. In an embodiment, the fingerprint recognition process may be partitioned into several phases, allowing the host 104 to enter the TEE between two different phases. For example, as shown in FIG. 4, the fingerprint recognition for user authentication includes two phases P1 and P2, and the host 104 enters the TEE at a time point between the phases P1 and P2. As a result, the host 104 is allowed to output the image fetch command between the two phases P1 and P2.

After receiving the image fetch command from the host 104, the fingerprint sensing circuit 102 is able to start the exposure operation. This allows the exposure operation for fake fingerprint detection and the fingerprint recognition for user authentication to be performed simultaneously. For example, the fingerprint recognition process for user authentication is performed in the first time period as described above, and the exposure operation for fake fingerprint detection may be performed in a third time period. In such a situation, the third time period may overlap the first time period.

In this embodiment as shown in FIG. 4, the time period in which the exposure operation for fake fingerprint detection is performed overlaps the time period for the phase P2 of the fingerprint recognition process, and the time period in which the light spot setting for fake fingerprint detection is performed overlaps the time period for the phase P1 of the fingerprint recognition process.

Figure 5:
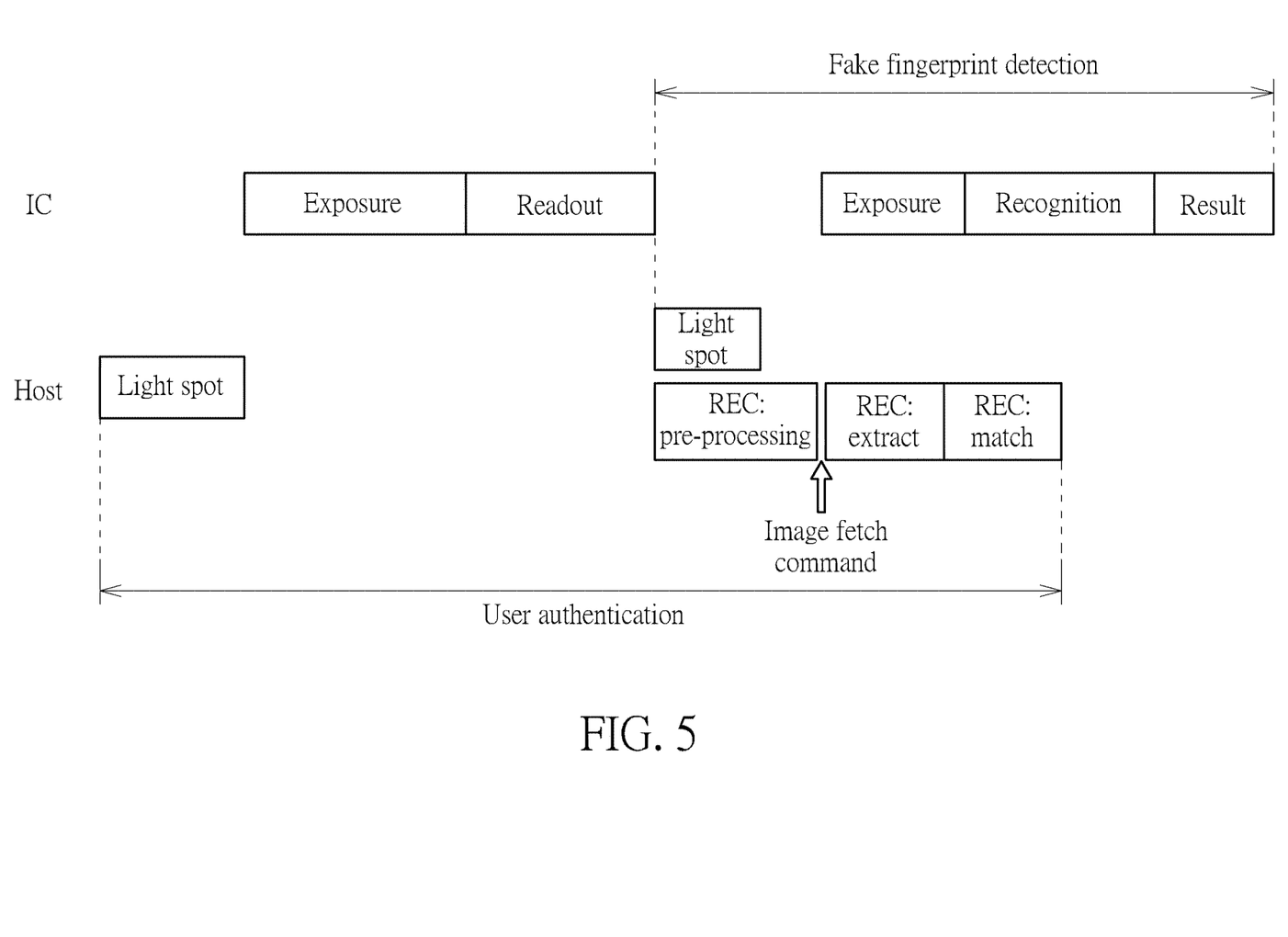
FIG. 5 further illustrates a detailed implementation of the partition of the fingerprint recognition process for user authentication.

FIG. 5 further illustrates a detailed implementation of the partition of the fingerprint recognition process for user authentication. As shown in FIG. 5, the fingerprint recognition process for user authentication may be partitioned into an image pre-processing operation, a feature extraction operation, and a feature matching operation, for example. In such a situation, the host 104 may enter the TEE between two of the operations, and the image fetch command may be sent in the TEE. In other words, the phase P1 shown in FIG. 4 may include the pre-processing operation (or called the pre-processing phase) and the phase P2 shown in FIG. 4 may include the feature extraction operation (or called the feature extraction phase).

Note that the above embodiment is merely an example for illustrating a possible partition manner of the fingerprint recognition algorithm. Those skilled in the art should understand that the fingerprint recognition algorithm may be partitioned in another manner, and the timing of entering the TEE may be configured accordingly.

In order to further reduce the overall time consumption of fingerprint recognition, the present invention provides an improvement that the fingerprint sensing circuit 102 is configured to perform the fingerprint recognition for fake fingerprint detection in response to the fingerprint sensing process, as shown in FIG. 5.

In detail, in a general timing control scheme for comparison, the fingerprint recognition for fake fingerprint detection is performed by the host 104; hence, the fingerprint sensing circuit 102 needs to transmit the fingerprint image data to the host 104 after exposure and readout, and this operation is usually time-consuming due to the considerable data quantity. In comparison, in the embodiment as shown in FIG. 5, the fingerprint sensing circuit 102 is capable of performing the fingerprint recognition for fake fingerprint detection and obtaining the corresponding determination result by itself. Therefore, the fingerprint sensing circuit 102 may be configured with a dedicated algorithm for fake fingerprint detection, to be used for determining whether the sensed fingerprint is real or fake, where the dedicated algorithm may be implemented in the hardware of the fingerprint sensing circuit 102. In such a situation, the fingerprint sensing circuit 102 only needs to send the determination result to the host 104, and thus the time consumption for outputting the fingerprint image data in the fake fingerprint detection operation may be saved. Note that the determination result, which only needs to indicate whether the fingerprint is real or fake, usually has a small data quantity far less than the data quantity of a frame of fingerprint image.

In this embodiment, the readout operation performed by the fingerprint sensing circuit 102 may be considered as receiving fingerprint image signals from the fingerprint sensor 100. After receiving the fingerprint image signals, the fingerprint sensing circuit 102 may perform recognition to determine the related fingerprint data represent a real or fake fingerprint.

Figure 6:
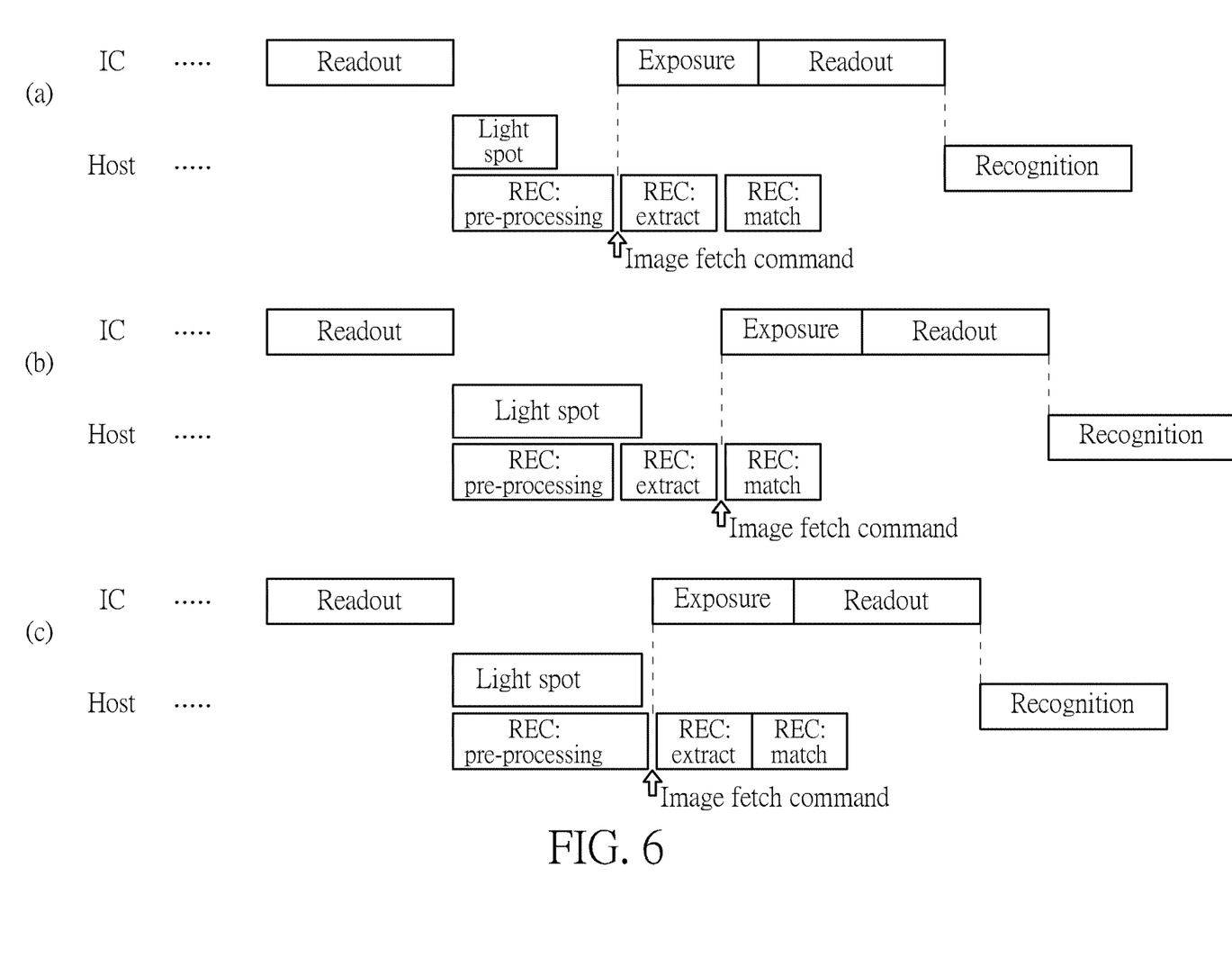
FIG. 6 is a schematic diagram of a timing control scheme of fingerprint sensing and recognition according to another embodiment of the present invention.

FIG. 6 is a schematic diagram of a timing control scheme of fingerprint sensing and recognition according to another embodiment of the present invention. FIG. 6 arms at illustrating the timing of the fingerprint sensing/recognition operations for fake fingerprint detection, and the light spot setting and exposure for user authentication are omitted. As shown in FIG. 6, the time required for setting light spot may be variable. In general, the time length used to complete the setting of light spot is variable based on whether the system is busy or free. For example, the time length of setting a light spot for fingerprint sensing on the panel may range from 30 milliseconds (ms) to 120 ms. If the system is very busy, the light spot may be completely set up in a longer time such as 120 ms; if the system is not busy, the light spot may be ready more rapidly such as 30 ms. Although the time length of setting the light spot might not be controlled easily, the fingerprint recognition process may be partitioned into several phases in an appropriate manner to be adapted to the possible setting time of the light spot, allowing the image fetch command to be delivered in a preferable time point, so as to reduce the waste of time.

As shown in FIG. 6(a), the light spot setting is completed within less time, and thus the image fetch command may be sent in the TEE allocated between the pre-processing phase and the feature extraction phase of fingerprint recognition. As shown in FIG. 6(b), the light spot setting requires a longer time and is completed after the end of the pre-processing phase, and thus the image fetch command should be delayed and sent in the TEE allocated between the feature extraction phase and the feature matching phase. In such a situation, the fingerprint sensing circuit 102 may start the exposure later, which increases the overall time consumption of fingerprint recognition. In order to reduce the time waste, the algorithm for fingerprint recognition may be rearranged so that the time length of the pre-processing phase is slightly greater than or equal to the possible setting time of the light spot, allowing the light spot setting for fake fingerprint detection to be completely performed before the feature extraction phase starts. Therefore, the image fetch command may be sent earlier, thereby reducing the time waste and decreasing the overall time consumption of the fingerprint recognition operations, as shown in FIG. 6(c).

Therefore, with an appropriate arrangement and partition of the fingerprint recognition algorithm, the light spot setting for fake fingerprint detection and the pre-processing phase of the fingerprint recognition for user authentication may be performed simultaneously; and the exposure operation for fake fingerprint detection and the subsequent phase(s) such as the feature extraction phase and/or the feature matching phase of the fingerprint recognition for user authentication may be performed simultaneously.

In addition, the pre-processing phase, the feature extraction phase and/or the feature matching phase may be partitioned into two or more sub-phases. Alternatively or additionally, the fingerprint recognition operation may be partitioned into four, five, or any number of phases, allowing the TEE to be allocated between two adjacent sub-phases or phases. In such a situation, the image fetch command may be sent at an appropriate time point by configuring the TEE adaptively. This improves the flexibility of timing allocation of the fake fingerprint detection, so as to further accelerate the fingerprint sensing and recognition processes.

In an embodiment, the fingerprint recognition algorithm may be partitioned to ensure that the host 104 may enter the TEE at least before a specific time point. If the image fetch command is sent and the fingerprint sensing circuit 102 starts the exposure for fake fingerprint detection before or on this time point, the fingerprint image data may be sent to the host 104 without any unwanted time waste. In fact, the partitions of the fingerprint recognition algorithm may be performed in any appropriate manner, which is not limited to the partitioning method discussed in this disclosure.

In several embodiments, the time length of setting the light spot may be different under different applications or different environmental situations. For example, if the ambient light is brighter, a weaker light spot is enough and thus the setting time of light spot can be shorter. Under the situation where the time length of light spot setting is controllable, this time length may be well controlled so that the light spot setting for fake fingerprint detection may be completely performed before the feature extraction phase starts, allowing the subsequent exposure operation to start at the start time of the feature extraction phase with minimum time delay.

As mentioned above, the fingerprint sensing circuit of the present invention may be integrated with a touch controller and a display driver to realize an FTDI circuit. The FTDI circuit may combine the touch detection operations and fingerprint sensing operations to achieve a specific function such as device unlocking.

Figure 7A:
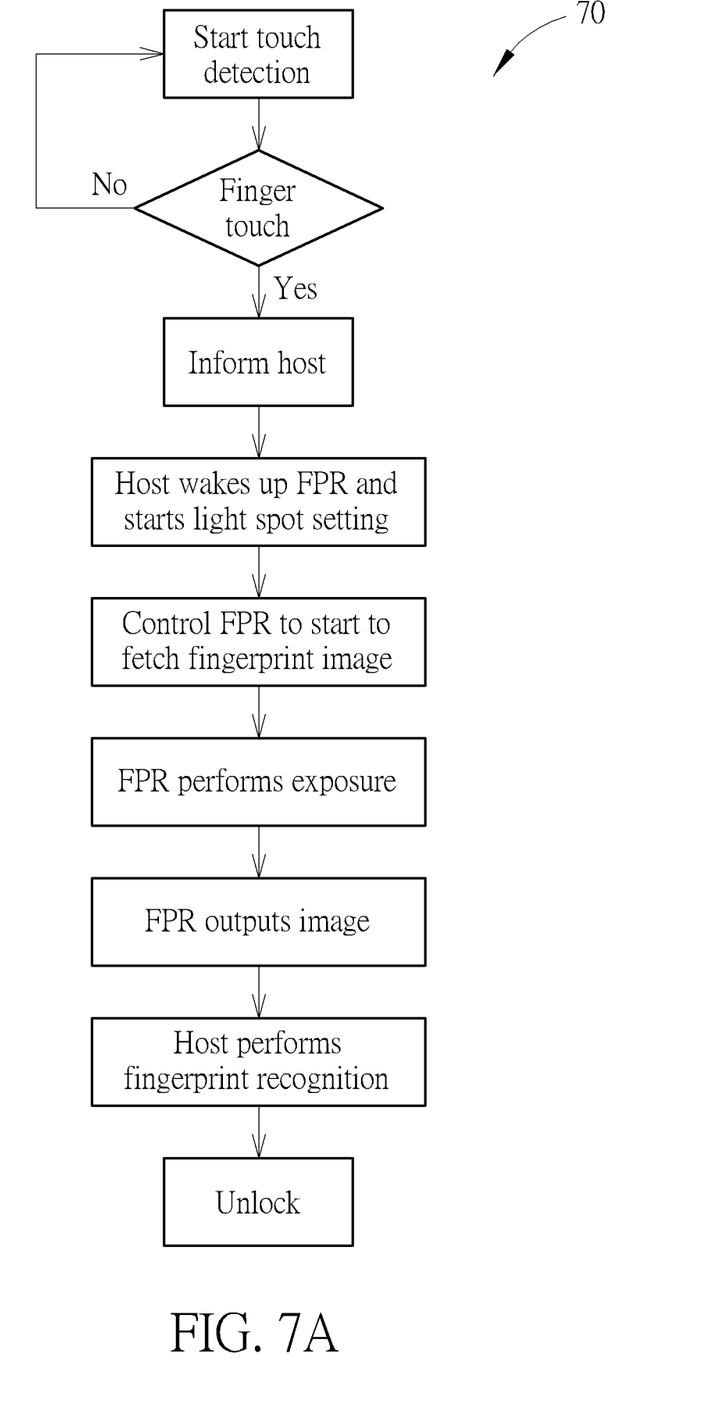
FIG. 7A is a flowchart of a fingerprint sensing and recognition process integrated with touch detection according to an embodiment of the present invention.

FIG. 7A is a flowchart of a fingerprint sensing and recognition process 70 integrated with touch detection according to an embodiment of the present invention. As shown in FIG. 7A, the touch controller starts touch detection first, to determine whether there is a finger touch on the panel. When detecting a finger touch, the FTDI circuit may inform the host, and the host may wake up the fingerprint sensing circuit (abbreviated as FPR in FIG. 7A). Meanwhile, the host notifies the display driver to start the light spot setting. After the light spot is ready, the host notifies the fingerprint sensing circuit to receive the fingerprint image, e.g., through an image fetch command output in the TEE. In response to the image fetch command, the fingerprint sensing circuit performs exposure and then outputs the fingerprint image to the host. The host thereby performs fingerprint recognition, and controls the device to be unlocked (or triggers other functions) if the fingerprint matching passes.

Since the FTDI circuit includes the display driver, it may be used to perform light spot control in addition to the touch detection and fingerprint sensing operations. Therefore, the light spot setting for the fingerprint sensing for user authentication and/or the fingerprint sensing for fake fingerprint detection may be performed by the FTDI circuit without intervention of the host. In an embodiment, when a finger touch is detected, the FTDI circuit may start to set the light spot based on internal clock display. The internal clock display is a display operation controlled by using the internal clock of the FTDI circuit, and can be performed without receiving any instruction and/or command from the host. In addition, since the light spot setting is controlled by the FTDI circuit by itself, the timing variations of the light spot setting may be reduced and may be controlled more easily.

Figure 7B:
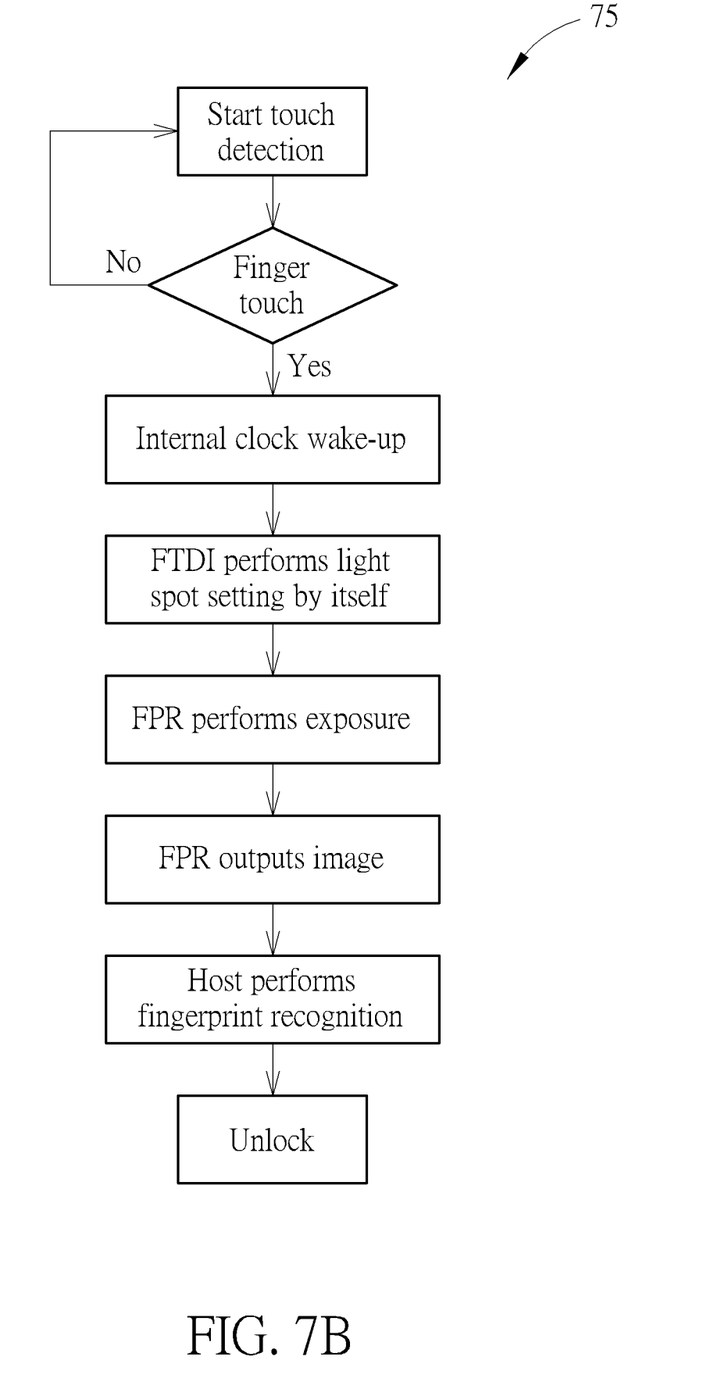
FIG. 7B is a flowchart of a fingerprint sensing and recognition process integrated with touch detection based on internal clock display.

FIG. 7B is a flowchart of a fingerprint sensing and recognition process 75 integrated with touch detection based on the internal clock display. As shown in FIG. 7B, when the finger touch is detected, the FTDI circuit may wake up the fingerprint sensing circuit and related display module by using the internal clock. Therefore, the FTDI circuit may set and display the light spot by itself without intervention of the host. The fingerprint sensing circuit of the FTDI circuit then starts exposure and outputs the fingerprint image to the host. Finally, the host performs fingerprint recognition based on the related algorithm, and controls the device to be unlocked (or triggers other functions) if the fingerprint matching passes. In this implementation, the host does not intervene in the light spot setting, and thus the negotiations and communications between the FTDI circuit and the host are simplified, which significantly reduces the time consumption of the fingerprint recognition process.

Please note that the process based on the internal clock display as shown in FIG. 7B is applicable to the fingerprint sensing and recognition operations of both user authentication and fake fingerprint detection. As a result, the steps from finger detection to fingerprint sensing may all be performed by the FTDI circuit without intervention of the host, thereby reducing the time of performing handshake and waiting between the FTDI circuit and the host. Also, the light spot setting may be controlled by the FTDI circuit itself, and will not be influenced by the busy degree of the host; hence, the light spot setting may be performed more efficiently. This facilitates the timing control and the arrangement/partition of fingerprint recognition algorithm for reducing time wastes in the fingerprint recognition processes.

Figure 8:
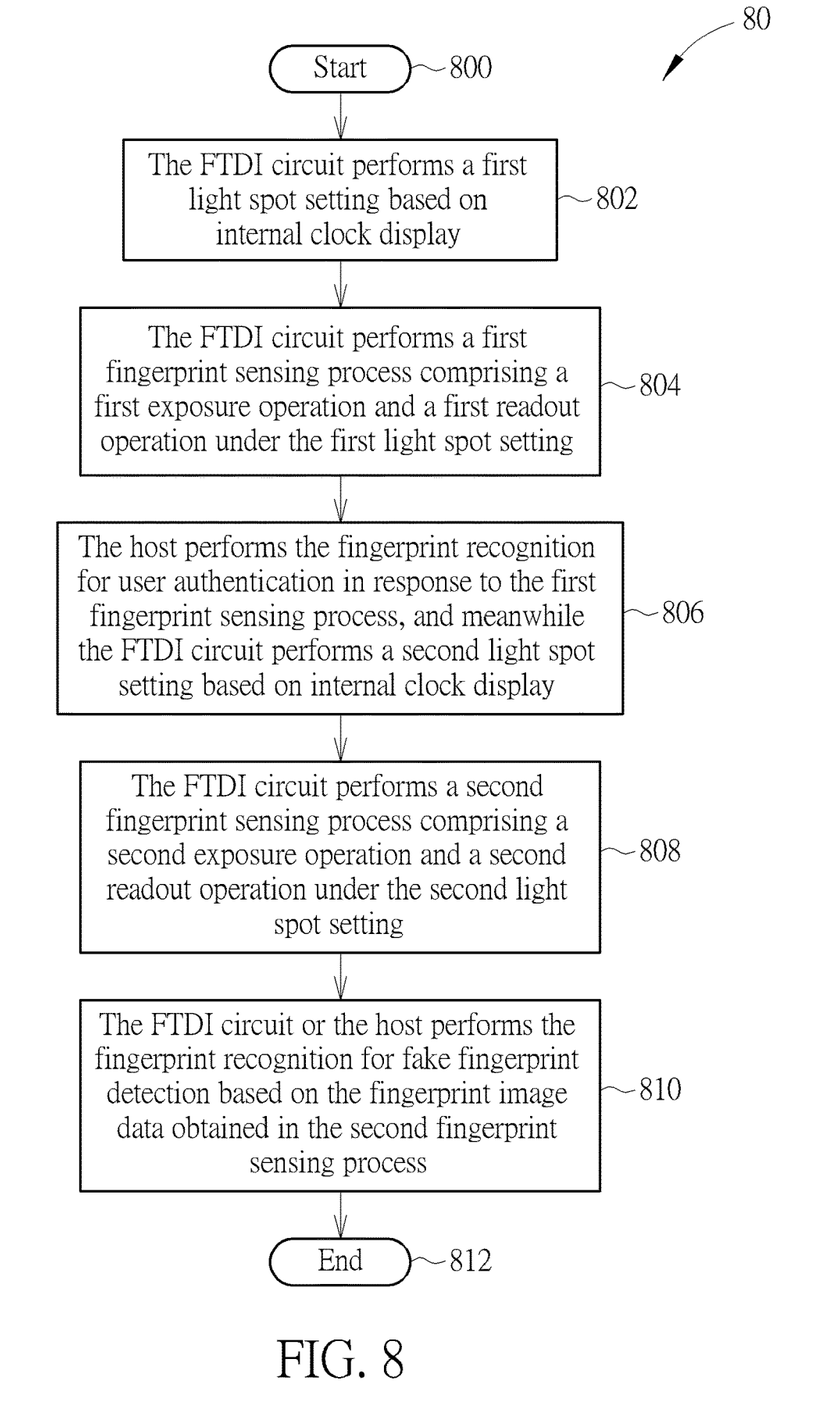
FIG. 8 is a flowchart of a fingerprint sensing and recognition process according to an embodiment of the present invention.

The abovementioned operations may be summarized into a fingerprint sensing and recognition process 80, as shown in FIG. 8. The fingerprint sensing and recognition process 80 may be implemented in a fingerprint image processing system, such as the fingerprint image processing system 10 shown in FIG. 1 or the fingerprint image processing system 20 shown in FIG. 2A. As shown in FIG. 8, the fingerprint sensing and recognition process 80 includes the following steps:

Step 800: Start.

Step 802: The FTDI circuit performs a first light spot setting based on internal clock display.

Step 804: The FTDI circuit performs a first fingerprint sensing process comprising a first exposure operation and a first readout operation under the first light spot setting.

Step 806: The host performs the fingerprint recognition for user authentication in response to the first fingerprint sensing process, and meanwhile the FTDI circuit performs a second light spot setting based on internal clock display.

Step 808: The FTDI circuit performs a second fingerprint sensing process comprising a second exposure operation and a second readout operation under the second light spot setting.

Step 810: The FTDI circuit or the host performs the fingerprint recognition for fake fingerprint detection based on the fingerprint image data obtained in the second fingerprint sensing process.

Step 812: End.

The detailed operations and alterations of the fingerprint sensing and recognition process 80 are illustrated in the above paragraphs, and will not be narrated herein.

To sum up, the present invention provides a method of fingerprint recognition and a related fingerprint sensing circuit having fake fingerprint detection functions. According to the present invention, several schemes are provided to accelerate the operation time of fingerprint sensing and recognition for user authentication and fake fingerprint detection. In an embodiment, when the host performs the fingerprint recognition for user authentication, the light spot setting for fake fingerprint detection is performed at the same time, in order to reduce overall time consumption. In an embodiment, the fingerprint recognition process for user authentication may be partitioned into several phases, and the image fetch command for instructing the fingerprint sensing circuit to start the exposure operation may be appropriately allocated between two adjacent phases. In an embodiment, the fingerprint sensing circuit may be used to perform the fingerprint recognition for fake fingerprint detection by itself, and send the determination result to the host. In an embodiment, as the fingerprint sensing circuit is integrated with a display driver in an FTDI circuit, the FTDI circuit may perform the light spot setting based on internal clock display without intervention of the host. The above embodiments may be selectively applied and combined to improve the efficiency of timing control for fingerprint sensing and recognition, so as to reduce the overall time consumption of fingerprint sensing and recognition, thereby improving the user experience.

Those skilled in the art will readily observe that numerous modifications and alterations of the device and method may be made while retaining the teachings of the invention. Accordingly, the above disclosure should be construed as limited only by the metes and bounds of the appended claims

What is claimed is:

1. A method of fingerprint recognition for a fingerprint sensing circuit, comprising:
   performing a first fingerprint sensing process comprising a first exposure operation and a first readout operation under a first light spot setting; and
   performing a second fingerprint sensing process comprising a second exposure operation and a second readout operation under a second light spot setting;
   wherein a host performs a first fingerprint recognition in response to the first fingerprint sensing process;
   wherein the second light spot setting and the first fingerprint recognition are performed simultaneously.

2. The method of claim 1, wherein the first fingerprint recognition is performed in a first time period and the second light spot setting is performed in a second time period, and the second time period overlaps the first time period.

3. The method of claim 1, wherein the second exposure operation and the first fingerprint recognition are performed simultaneously.

4. The method of claim 3, wherein the first fingerprint recognition is performed in a first time period and the second exposure operation is performed in a third time period, and the third time period overlaps the first time period.

5. The method of claim 1, wherein the first fingerprint sensing process is used for user authentication and the second fingerprint sensing process is used for fake fingerprint detection.

6. The method of claim 1, wherein the first fingerprint recognition comprises a first phase and a second phase, and the method further comprises:
   starting the second exposure operation at a time point between the first phase and the second phase.

7. The method of claim 6, wherein the first fingerprint recognition comprises a pre-processing operation, a feature extraction operation and a feature matching operation, and the first phase comprises the pre-processing operation and the second phase comprises the feature extraction operation.

8. The method of claim 6, further comprising:
receiving an image fetch command from the host at the time point, wherein the image fetch command instructs the fingerprint sensing circuit to start the second exposure operation.

9. The method of claim 6, further comprising:
controlling a time length for performing the second light spot setting, allowing the second light spot setting to be completely performed before the second phase starts.

10. The method of claim 6, further comprising:
allocating a time length of the first phase to control the second light spot setting to be completely performed before the second phase starts.

11. The method of claim 1, further comprising:
performing a second fingerprint recognition in response to the second fingerprint sensing process.

12. The method of claim 11, further comprising:
obtaining a determination result by performing the second fingerprint recognition; and
outputting the determination result to the host.

13. The method of claim 1, wherein at least one of the first light spot setting and the second light spot setting is performed without intervention of the host.

14. The method of claim 1, wherein at least one of the first light spot setting and the second light spot setting is performed by using an internal clock of the fingerprint sensing circuit.

15. A fingerprint sensing circuit, configured to:
perform a first fingerprint sensing process comprising a first exposure operation and a first readout operation under a first light spot setting; and
perform a second fingerprint sensing process comprising a second exposure operation and a second readout operation under a second light spot setting;
wherein a host performs a first fingerprint recognition in response to the first fingerprint sensing process;
wherein the second light spot setting and the first fingerprint recognition are performed simultaneously.

16. The fingerprint sensing circuit of claim 15, wherein the first fingerprint recognition is performed in a first time period and the second light spot setting is performed in a second time period, and the second time period overlaps the first time period.

17. The fingerprint sensing circuit of claim 15, wherein the second exposure operation and the first fingerprint recognition are performed simultaneously.

18. The fingerprint sensing circuit of claim 17, wherein the first fingerprint recognition is performed in a first time period and the second exposure operation is performed in a third time period, and the third time period overlaps the first time period.

19. The fingerprint sensing circuit of claim 15, wherein the first fingerprint sensing process is used for user authentication and the second fingerprint sensing process is used for fake fingerprint detection.

20. The fingerprint sensing circuit of claim 15, wherein the first fingerprint recognition comprises a first phase and a second phase, and the fingerprint sensing circuit is further configured to start the second exposure operation at a time point between the first phase and the second phase.

21. The fingerprint sensing circuit of claim 20, wherein the first fingerprint recognition comprises a pre-processing operation, a feature extraction operation and a feature matching operation, and the first phase comprises the pre-processing operation and the second phase comprises the feature extraction operation.

22. The fingerprint sensing circuit of claim 20, further configured to receive an image fetch command from the host at the time point, wherein the image fetch command instructs the fingerprint sensing circuit to start the second exposure operation.

23. The fingerprint sensing circuit of claim 20, further configured to control a time length for performing the second light spot setting, allowing the second light spot setting to be completely performed before the second phase starts.

24. The fingerprint sensing circuit of claim 20, further configured to allocate a time length of the first phase to control the second light spot setting to be completely performed before the second phase starts.

25. The fingerprint sensing circuit of claim 15, further configured to perform a second fingerprint recognition in response to the second fingerprint sensing process.

26. The fingerprint sensing circuit of claim 25, further configured to obtain a determination result by performing the second fingerprint recognition, and output the determination result to the host.

27. The fingerprint sensing circuit of claim 15, wherein at least one of the first light spot setting and the second light spot setting is performed without intervention of the host.

28. The fingerprint sensing circuit of claim 15, wherein at least one of the first light spot setting and the second light spot setting is performed by using an internal clock of the fingerprint sensing circuit.

* * * * *